(12) United States Patent
DeMange

(10) Patent No.: US 6,726,515 B1
(45) Date of Patent: Apr. 27, 2004

(54) STERN LOCK-OUTBOARD LOCK

(76) Inventor: Craig J. DeMange, 1031 Logan Blvd., Naples, FL (US) 34116

( * ) Notice: Subject to any disclaimer, the term of this patent is extended or adjusted under 35 U.S.C. 154(b) by 114 days.

(21) Appl. No.: 10/171,242

(22) Filed: Jun. 14, 2002

(51) Int. Cl.[7] ................................................. F16B 41/00
(52) U.S. Cl. ........................................ 440/113; 70/230
(58) Field of Search ................................ 440/113, 900; 70/229, 230

(56) References Cited

U.S. PATENT DOCUMENTS

| | | | | |
|---|---|---|---|---|
| 1,942,176 A | * | 1/1934 | Lowe | 70/259 |
| 3,600,912 A | * | 8/1971 | Foreman | 70/77 |
| 4,030,324 A | * | 6/1977 | Rizio | 70/232 |
| 4,466,261 A | * | 8/1984 | Zimmer | 70/229 |
| 4,710,082 A | * | 12/1987 | Curtis | 411/373 |
| 5,392,621 A | * | 2/1995 | Dunnigan | 70/232 |

* cited by examiner

*Primary Examiner*—Sherman Basinger
(74) *Attorney, Agent, or Firm*—Werner Schroder

(57) ABSTRACT

The invention is directed to dead bolt receiver lock that is installed in a boat between the transom and the clamp that mounts an outboard motor to the boat. The dead bolt prevents the unauthorized removal of the outboard motor from the boat. To this end, there is used a dead bolt having at end thereof a rounded head and a another end thereof a threaded end. At the threaded end there mounted a fastening which receives a locking cylinder operated by a key to lock the dead bolt in a locked position to prevent the dead bolt receiver to be removed from the transom clamp combination to prevent any unauthorized removal of the outboard motor from the boat.

3 Claims, 2 Drawing Sheets

STERN LOCK-OUTBOARD LOCK

CROSS REFERENCES TO RELATED APPLICATIONS (none)

STATEMENT REGARDING FED SPONSORED R & D (none)

BACKGROUND OF THE INVENTION

The present invention pertains to a theft prevention device on a drive installation on a boat. Many drive installations in or on a boat involve either an outboard motor or an inboard motor. A copending application Ser. No. 09/690,882 filed on Oct. 17, 2000, now abandoned, is directed to a theft prevention installation on an inboard motor. It is quite clear to those skilled in the art that the inboard and outboard motor installations are quite different from each other An outboard motor installation involves a self contained motor that is simply installed on the transom of the board. A clamp is installed over the transom and the clamp has a hinge attached thereto which allows the outboard motor to raised out of the water or lowered into the water for operation. In the past, there has been a problem of thefts of outboard motors simply by removing the attending clamp of the motor from the transom of the boat. The present invention prevents such theft by simply passing a locking bolt through the clamp and the transom whereby the outboard motor cannot be removed from the transom without the use of a key.

The only locking bolt found in the prior art is shown in U.S. Pat. No. 5,392,621. The locking bolt in this patent is used on an inboard motor to lock a shield over certain parts that would allow the lower drive of the inboard motor. The theft prevention bolt of this invention is the only item used to prevent the removal of the outboard motor. It is designed so that the bolt cannot be destroyed unless excessive force is applied.

DETAILED DESCRIPTION OF THE INVENTION

Figure 1:
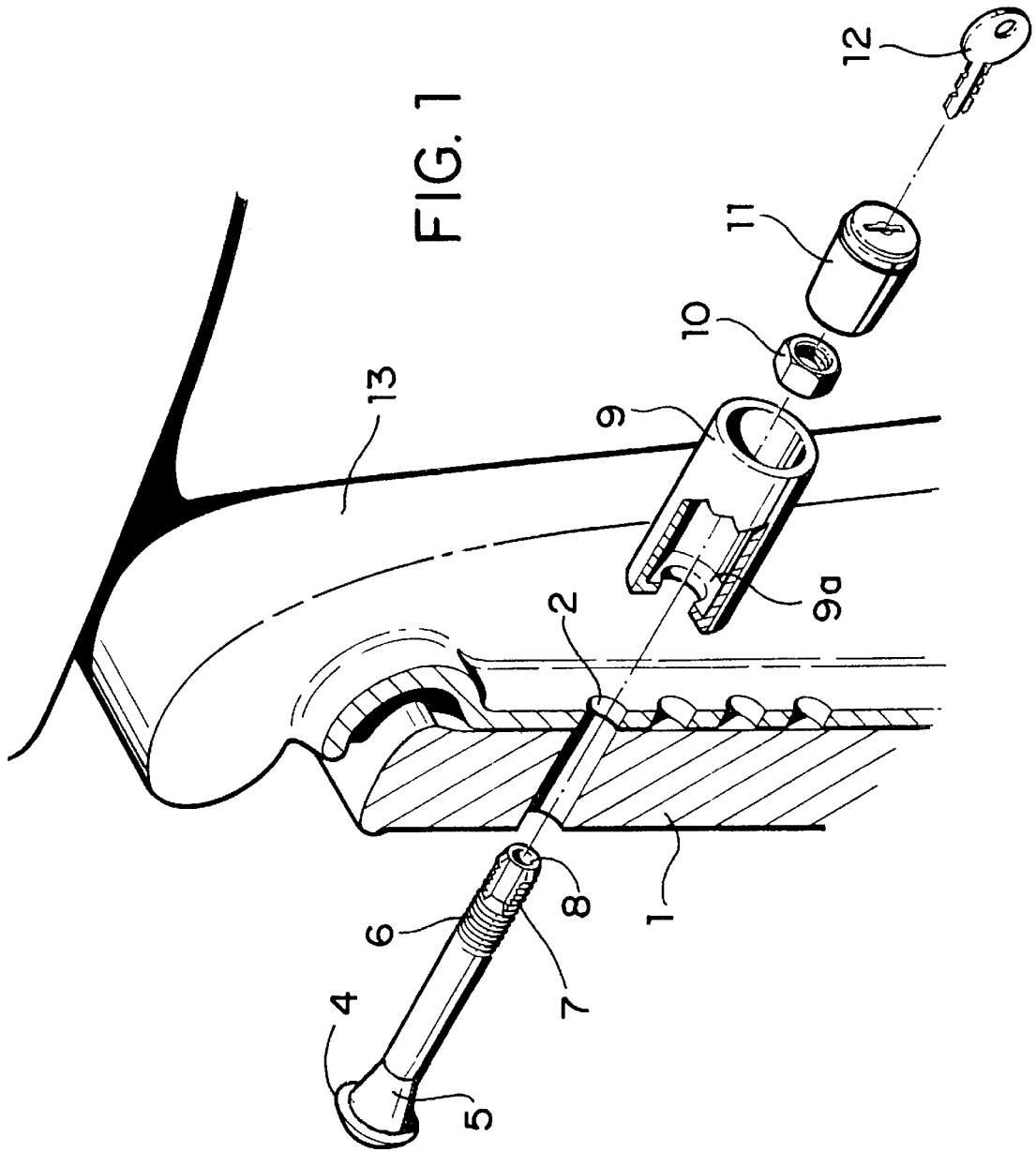
FIG. 1 shows the transom of the boat with a simulated installation of the bolt.

FIG. 1 shows an exploded view of the lock bolt as it is passed through the transom of the boat and the clamp of the outboard motor. The transom is indicated at 1 while a through bore through the transom 1 as shown at 2. The clamp for the outboard motor is shown at 13. The through bore 2 also passes through the clamp 13. The bolt 3 (shown in FIG. 2) will pass through the through bore 2 until the head 4 will seat against an inner surface of the transom 1. Just past the head 4 there is a tapered section 5 which aids in seating the bolt 3 into the through bore 2. This section 5 results in that no further tools are required when the bolt 3 is tightened in its ultimate position. The tapered section 5 will enter the through bore 2 and will frictionally increase its force against the through bore so that it can no longer turn as the tightening force wedges the tapered section 5 within the through bore 2 as the tightening force is increased at the other end of the bolt 3.

Figure 2:
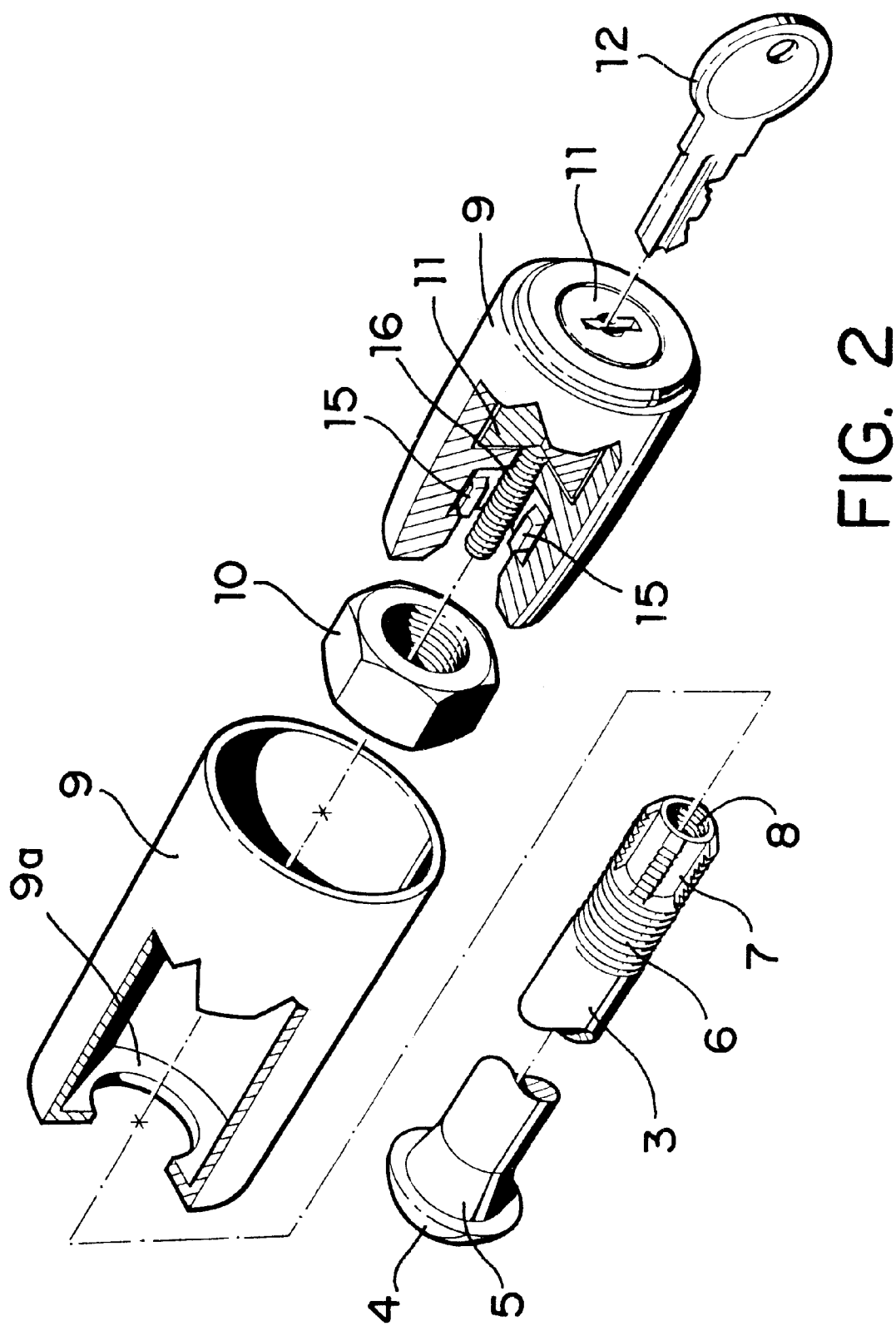
FIG. 2 shows an exploded view of the individual parts of the locking bolt.

At the other end of the bolt 3 in FIG. 2 there are located two threaded sections 6 an 7. The first threaded section 6 is of a standard thread and is threaded to receive the nut 10. When the through bolt 3 is passed into the through bore 2 as far as it will go, the fastening cylinder 9 is passed over the protruding threaded sections 6 and 7 until it seats against the outer surface of the clamp 13. The bottom of the fastening cylinder has an inwardly directed flange 9a against which the nut 10 will abut and will be fastened against the outer surface of the clamp 13.

The second section 7 has the same threads as those of section 6 but this section is fluted and also has interior threads 8. After the fastening cylinder and thereby the bolt 3 have been fastened securely into place, the locking cylinder 11 with its threaded stud 16 will be threaded into the interior threads 8 of the bolt 3. All the while, the female flutes 7 on the bolt 3 will be engaged by exterior or male flutes 15 of the fastening bolt 3. In this manner, any rotation of the locking cylinder 11 is avoided while the interior threaded stud 16 continues to thread into the interior threads 8 of the end of the bolt 3. This threading can only be accomplished by the key 12. When the threaded bolt hits bottom or is fully threaded in, the key 12 is removed and no further threading is possible in or out. In this manner, unless a key is being used, the dead bolt receiver lock cannot be removed from the outboard motor board motor combination without a key 12. No tools can be applied on either end of the bolt 3. At the inboard side of the transom, there is a rounded head 4 to which no tool can be applied and on the right side is a round cylinder with the locking cylinder 11 securely confined within the fastening cylinder 9. No tools can be applied to this end.

What I claim is:

1. A stern lock-outboard lock adapted to be installed between a transom of a boat and a clamp of an outboard motor including a dead bolt passing through said transom and said clamp and having a rounded head at one end thereof and a threaded end at another end thereof, said threaded end consisting of two sections, a first section having said threaded end and a second end wherein said threaded end is fluted, a fastening cylinder is received over said second end to abut against said clamp of said outboard motor including a nut received over said second end and being screwed down against an interior flange of said fastening cylinder and thereby against said clamp of said outboard motor, said dead bolt further having at its threaded end interior threads, said interior threads receiving a threaded stud of a locking cylinder, said fastening cylinder having said locking cylinder inserted therein, said locking cylinder having a key operated locking system incorporated therein.

2. The stern lock-outboard lock of claim 1, wherein at said first end behind said rounded head there is a tapered section.

3. The stern lock-outboard lock of claim 1, wherein said locking cylinder at its outer end is flush with said fastening cylinder.

* * * * *